US010965507B1

(12) United States Patent
Steele et al.

(10) Patent No.: US 10,965,507 B1
(45) Date of Patent: Mar. 30, 2021

(54) CONSTANT ENVELOPE BARKER-MODULATED WLAN WAVEFORM

(71) Applicant: QUALCOMM Incorporated, San Diego, CA (US)

(72) Inventors: Gregory Steele, Pleasanton, CA (US); Didier Johannes Richard Van Nee, Tull en't Waal (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/778,590

(22) Filed: Jan. 31, 2020

(51) Int. Cl.
*H04B 1/69* (2011.01)
*H04L 27/26* (2006.01)
*H04W 84/12* (2009.01)
*H04B 1/707* (2011.01)

(52) U.S. Cl.
CPC ......... *H04L 27/2602* (2013.01); *H04B 1/707* (2013.01); *H04L 27/2614* (2013.01); *H04L 27/2669* (2013.01); *H04W 84/12* (2013.01)

(58) Field of Classification Search
CPC ............. H04L 27/2602; H04L 27/2669; H04L 27/2614; H04W 84/12; H04B 1/707

USPC .......................................................... 375/130
See application file for complete search history.

(56) References Cited

U.S. PATENT DOCUMENTS

| | | | | |
|---|---|---|---|---|
| 2007/0133495 | A1* | 6/2007 | Lee ....................... | H04B 1/7176 370/342 |
| 2009/0296853 | A1* | 12/2009 | Doong .............. | H04L 25/03834 375/296 |
| 2010/0310009 | A1* | 12/2010 | Lakkis ................ | H04L 27/2003 375/308 |
| 2018/0375703 | A1* | 12/2018 | Kellogg ................ | H04L 5/0007 |
| 2019/0044551 | A1* | 2/2019 | Dinc ......................... | G01S 7/35 |

\* cited by examiner

*Primary Examiner* — Don N Vo
(74) *Attorney, Agent, or Firm* — Patterson + Sheridan, L.L.P.; Kevin M. Donnelly

(57) ABSTRACT

This disclosure provides methods, apparatuses, wireless nodes, and computer-readable mediums for wireless communications. In one aspect, a method is provide for a Barker-modulated waveform with constant envelope for a wireless local area network (WLAN) signal. A method that may be performed by a transmitter device includes generating a Barker-modulated signal having a constant envelope and transmitting the Barker-modulated signal in a WLAN.

16 Claims, 19 Drawing Sheets

700

| Barker Symbol Phase (0-3) | Current Phase | DPSK Phase |
|---|---|---|
| 0 or 3 | 0 | 0 |
| 0 or 3 | 1 | 1 |
| 0 or 3 | 2 | 2 |
| 0 or 3 | 3 | 3 |
| 1 or 2 | 0 | 0 |
| 1 or 2 | 1 | 1 |
| 1 or 2 | 2 | -2 |
| 1 or 2 | 3 | -1 |

| alpha0 | alpha1 | alpha2 |
|---|---|---|
| 01110001 | 110010110 | 100110 |
| 01110011 | 110010100 | 101000 |
| 01110110 | 110010010 | 101010 |
| 01111000 | 110010000 | 101100 |
| 01111011 | 110001110 | 101111 |
| 01111110 | 110001100 | 110001 |
| 10000000 | 110001010 | 110011 |
| 10000011 | 110001000 | 110110 |
| 10000101 | 110000110 | 111000 |
| 10001000 | 110000100 | 111011 |
| 10001010 | 110000010 | 111101 |

| alpha 4 | 1000 |
|---------|------|
| alpha 5 | 1289 |
| alpha 6 | 994  |
| alpha 7 | 1630 |

US 10,965,507 B1

CONSTANT ENVELOPE BARKER-MODULATED WLAN WAVEFORM

TECHNICAL FIELD

This disclosure relates generally to wireless communications, and more particularly to a Barker-modulated waveform with a constant envelope for a wireless local area network (WLAN) signal.

DESCRIPTION OF THE RELATED TECHNOLOGY

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The deployment of wireless local area networks (WLANs, sometimes referred to as WiFi networks) in the home, the office, and various public facilities is commonplace today. Such networks typically employ a wireless access point (AP) that connects a number of wireless stations (STAs) in a specific locality (such as the aforementioned home, office, public facility, etc.) to another network, such as the Internet or the like. A set of STAs can communicate with each other through a common AP in what is referred to as a basic service set (BSS).

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of WLAN air interface standards developed by the IEEE 802.11 committee for short-range communications (such as tens of meters to a few hundred meters).

SUMMARY

The systems, methods, apparatuses, computer-readable mediums, and wireless nodes of this disclosure each have several innovative aspects, no single one of which is solely responsible for the desirable attributes disclosed herein.

One innovative aspect of the subject matter described in this disclosure can be implemented in a method for wireless communications by a transmitter device. The method generally includes generating a Barker-modulated signal having a constant envelope. The method generally includes transmitting the Barker-modulated signal in a wireless local area network (WLAN).

In some implementations, the Barker-modulated signal is transmitted at peak power amplifier (PA) power. In some implementations, the Barker-modulated signal conforms to an IEEE 802.11b waveform. In some implementations, the Barker-modulated signal is transmitted at a 1 or 2 Mbps rate with a Barker spread spectrum sequence.

In some implementations, generating the Barker-modulated signal includes scrambling bits to obtain scrambled bits; and encoding the scrambled bits to obtain a plurality of different Barker phase codes in a phase domain, the plurality of different Barker phase codes being represented by values of pi. In some implementations, the transmitter device precodes each symbol of the plurality of different Barker phase codes by calculating a phase difference between a first phase of a current symbol and a last phase of a previous symbol; rounding the phase difference to a nearest two pi; and adding the rounded phase difference to each phase of the current symbol. In some implementations, the transmitter device filters the plurality of different Barker phase codes in the phase domain. In some implementations, the filtering uses a Gaussian or Butterworth impulse response filter. In some implementations, the transmitter device maps the filtered Barker phase codes to the in-phase and quadrature (IQ) domain.

One innovative aspect of the subject matter described in this disclosure can be implemented in an apparatus for wireless communications. The apparatus generally includes a processing system configured to generate a Barker-modulated signal having a constant envelope. The apparatus generally includes an interface configured to transmit the Barker-modulated signal in a wireless local area network (WLAN).

One innovative aspect of the subject matter described in this disclosure can be implemented in an apparatus for wireless communications. The apparatus generally includes means for generating a Barker-modulated signal having a constant envelope. The apparatus generally includes means for transmitting the Barker-modulated signal in a wireless local area network (WLAN).

One innovative aspect of the subject matter described in this disclosure can be implemented in a computer-readable medium storing computer-executable code thereon for wireless communications. The computer-readable medium generally includes code for generating a Barker-modulating signal having a constant envelope and code for transmitting the Barker-modulated signal in a wireless local area network (WLAN).

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 shows a table with example phase mappings used by the Barker encoder.

FIG. 11 shows a table with example alpha parameter values used for the third-order filter block of FIG. 8.

Like reference numbers and designations in the various drawings indicate like elements

DETAILED DESCRIPTION

Figure 1:
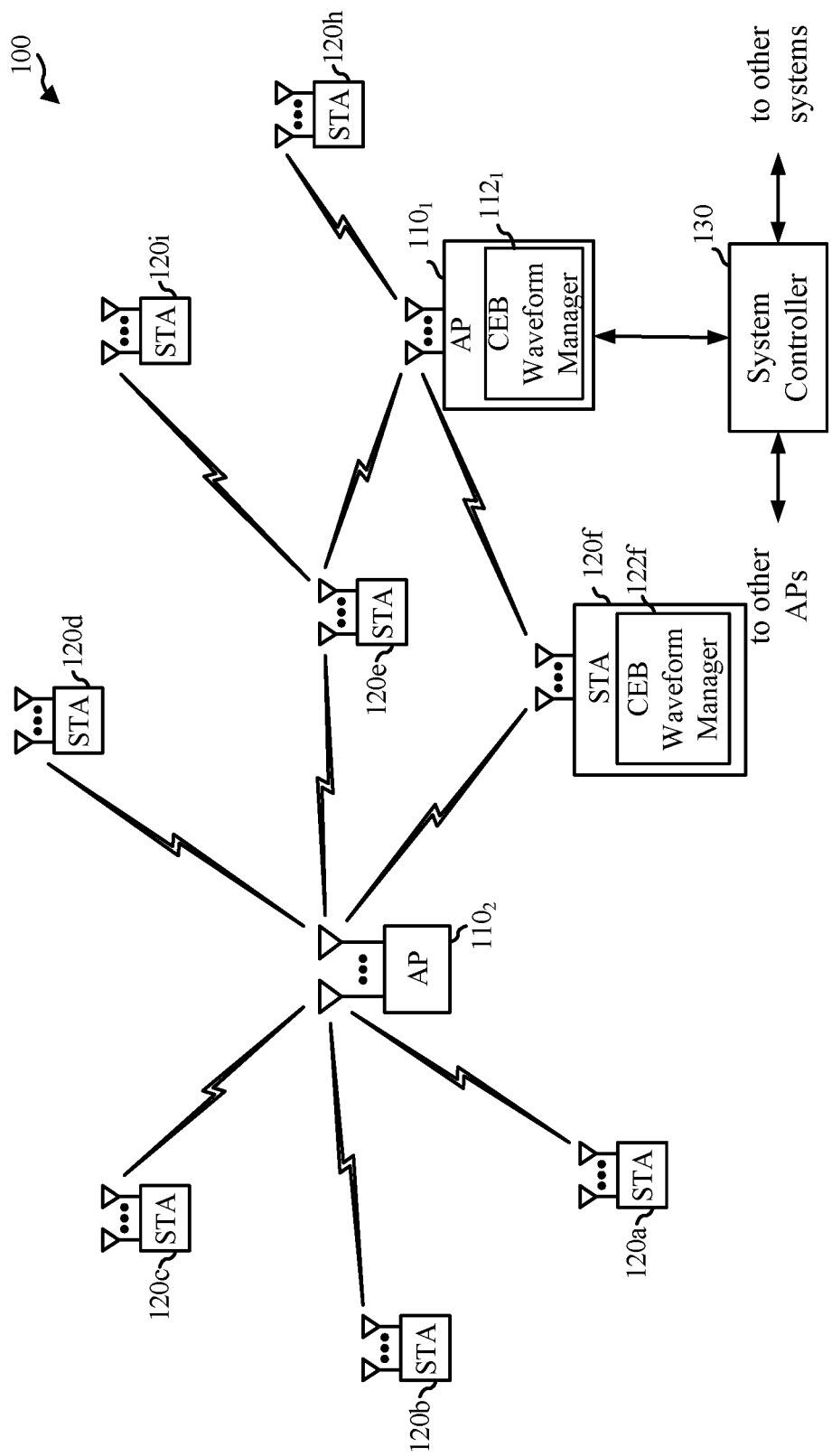
FIG. 1 shows a system diagram of an example network in which one or more aspects of the subject matter described in this disclosure can be implemented.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, and the IEEE 802.3 Ethernet standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or Internet-of-Things (IOT) network, such as a system utilizing 3G, 4G or 5G, or further implementations thereof, technology.

One or more innovative aspects of the subject matter described in this disclosure relate to a Barker-modulated signal with a constant envelope that is compliant with a WLAN system (e.g., complies with an 802.11 waveform).

In certain WLAN systems (e.g., 802.11b WLAN systems), the transmit power of the Barker transmit waveforms may be limited. Peak-to-average power ratio (PAPR) of the Barker transmit waveform may be roughly 2.5 dB due to filtering for spectral shaping (e.g., conforming to a 802.11b spectral mask). This means that average power of the Barker transmission is at least 2.5 dB from peak power amplifier (PA) power. In addition, the Barker waveforms may be sensitive to PA nonlinearity. The transmit power for the Barker transmission may be reduced an additional 1 dB to allow for transmit power control inaccuracy. Thus, in such WLAN systems, the transmit power of the Barker waveforms may be 3.5 dB from peak PA power.

Aspects of the present disclosure provide a Barker transmission waveform with a constant envelope. The constant envelope Barker (CEB) waveform may be compliant with a WLAN system. For example, the CEB waveform may be 802.11 (e.g., 802.11b) compliant.

There are various advantages to a CEB waveform in accordance with aspects of the subject matter described in this disclosure. One advantage is that the CEB waveform is WLAN compliant. Another advantage is that the CEB waveform is resilient to PA nonlinearity. Amplitude modulation (AM)-AM distortion is the difference between the supply voltage and the envelope of the radio frequency (RF) output voltage. Such a difference is caused by a nonlinear relationship between the supply voltage and the envelope of the RF output signal. AM-PM (phase modulation) distortion is an unwanted phase modulation of the RF output carrier due to the modulation of the supply voltage. The CEB waveform may have no AM/AM and/or AM/PM distortion because the CEB waveform with constant envelope may operate at a single constant amplitude. Another advantage is that the CEB waveform can have a PAPR of 0 dB. The PA can be driven at its saturated output power (Psat) without distortion. Thus, the CEB waveform may be transmitted at maximum PA power, while still complying with WLAN spectral mask targets. Therefore, the CEB waveform may allow for a net increase in transmit power relative to other WLAN system waveforms.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The teachings herein may be incorporated into (such as implemented within or performed by) a variety of wired or wireless apparatuses (such as nodes). In some aspects, a wireless node implemented in accordance with the teachings herein may include an access point (AP) or an access terminal (AT).

FIG. 1 shows a system diagram of an example network in which one or more aspects of the subject matter described in this disclosure can be implemented. The network 100 may be, for example, a multiple-access multiple-input multiple-output (MIMO) system with APs 110 and stations (STAs) 120 (which may be non-AP STAs). An AP is generally a fixed station that communicates with the STAs. AP $110_1$ or AP $110_2$ may communicate with one or more stations (STAs) 120 at any given moment on the downlink and uplink. The downlink (i.e., forward link) is the communication link from the access point to the user terminals, and the uplink (i.e., reverse link) is the communication link from the user terminals to the AP $110_1$ or AP $110_2$. An STA may also communicate peer-to-peer with another STA.

APs such as AP $110_1$ and AP $110_2$ may include, be implemented as, or known as a Node B, a Radio Network Controller (RNC), an evolved Node B (eNB), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), or some other terminology.

A STA 120 may be fixed or mobile. An may include, be implemented as, or known as a subscriber station, an access terminal (AT), a subscriber unit, a mobile station (MS), a remote station, a remote terminal, a user terminal (UT), a user agent, a user device, user equipment (UE), a user station, or some other terminology. In some implementations, an STA 120 may include a cellular telephone, a cordless telephone, a Session Initiation Protocol (SIP) phone, a wireless local loop (WLL) station, a personal digital assistant (PDA), a handheld device having wireless connection capability, a Station (STA), or some other suitable processing device connected to a wireless modem. Accordingly, one or more aspects taught herein may be incorporated into a phone (such as a cellular phone or smart phone), a computer (such as a laptop), a portable communication device, a portable computing device (such as a personal data assistant), an entertainment device (such as a music or video device, or a satellite radio), a global positioning system device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communication link.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another (such as directly or indirectly) via a wireless or wireline backhaul.

While portions of the following disclosure will describe STAs 120 capable of communicating via Spatial Division Multiple Access (SDMA), for certain aspects, the STAs 120 may also include some STA that do not support SDMA. Thus, for such aspects, an AP 110 may be configured to communicate with both SDMA and non-SDMA stations. This approach may allow older versions of stations ("legacy" stations) to remain deployed in an enterprise, extending their useful lifetime, while allowing newer SDMA stations to be introduced as deemed appropriate.

The network 100 employs multiple transmit and multiple receive antennas for data transmission on the downlink and uplink. The AP 110 is equipped with $N_{ap}$ antennas and represents the multiple-input (MI) for downlink transmissions and the multiple-output (MO) for uplink transmissions. A set of K selected STAs 120 collectively represents the multiple-output for downlink transmissions and the multiple-input for uplink transmissions. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected STA 120 transmits user-specific data to or receives user-specific data from the AP 110. In general, each selected STA 120 may be equipped with one or multiple antennas (i.e., $N_{ut} > 1$). The K selected STAs can have the same or different number of antennas.

The network 100 may be a time division duplex (TDD) system or a frequency division duplex (FDD) system. For a TDD system, the downlink and uplink share the same frequency band. For an FDD system, the downlink and uplink use different frequency bands. Network 100 also may utilize a single carrier or multiple carriers for transmission. Each STA 120 may be equipped with a single antenna (such as in order to keep costs down) or multiple antennas (such as where the additional cost can be supported). The network 100 also may be a TDMA system if the STAs 120 share the same frequency channel by dividing transmission/reception into different time slots, each time slot being assigned to different STA 120.

According to certain aspects, the APs 110 may be configured for UL TX mode selection and triggering. As shown in FIG. 1, the AP $110_1$ includes CEB waveform manager 1121. The STA $120f$ includes CEB waveform manager $122f$. The CEB waveform manager 1121 and/or the CEB waveform manager $122f$ may be configured to generate a Barker-modulated waveform having a constant envelope and to transmit the Barker-modulated waveform in a WLAN system.

Figure 2:
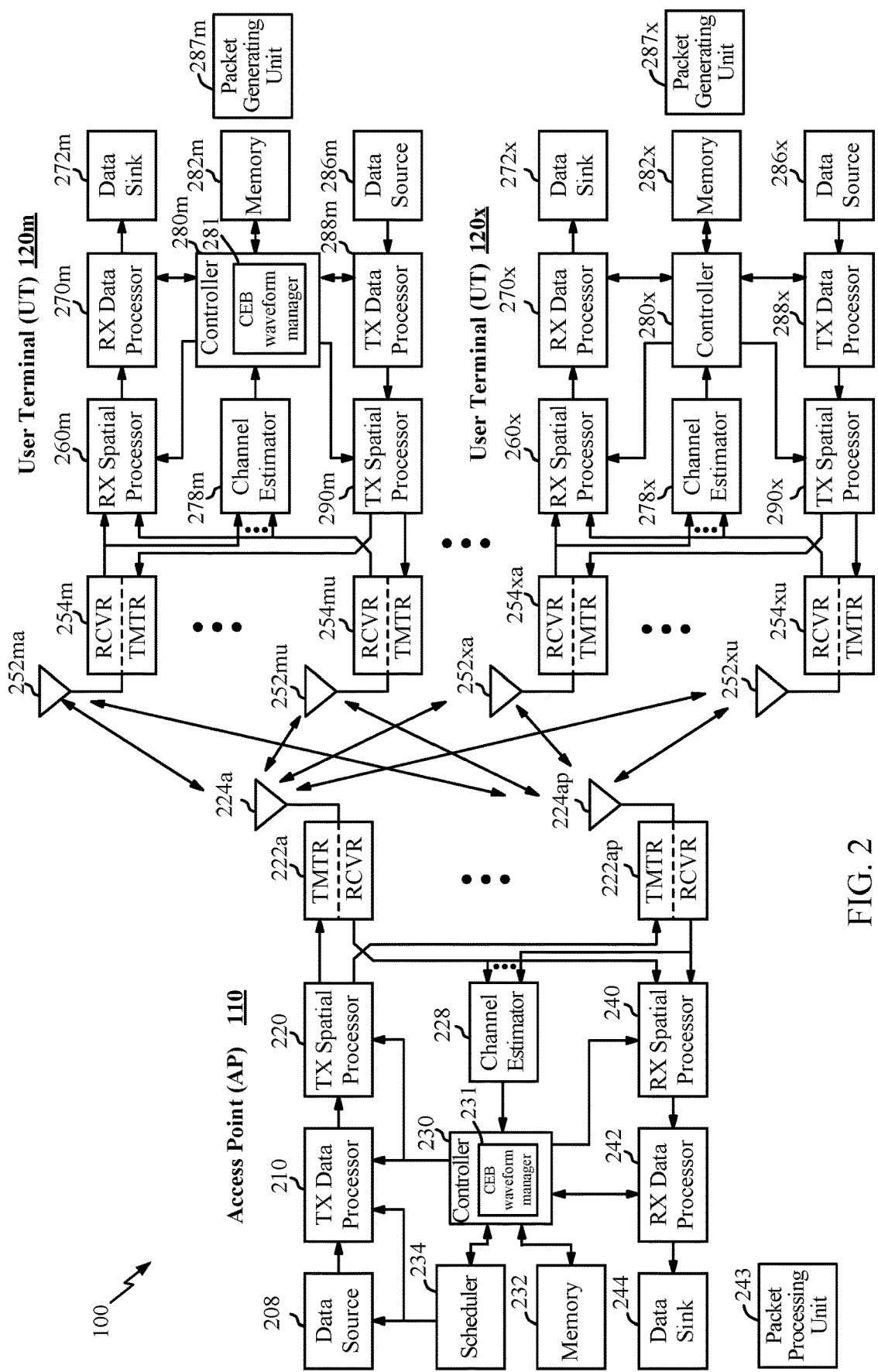
FIG. 2 shows a block diagram of example devices shown in FIG. 1.

FIG. 2 shows a block diagram of example devices shown in FIG. 1. FIG. 2 illustrates a block diagram of AP 110 and two STAs 120m and 120x in network 100. The AP 110 is equipped with $N_t$ antennas 224a-224t. STA 120m is equipped with $N_{ut,m}$ antennas 252ma-252mu, and STA 120x is equipped with $N_{ut,x}$ antennas 252xa-252xu. The AP 110 is a transmitting entity for the downlink and a receiving entity for the uplink. Each STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, $N_{up}$ STAs are selected for simultaneous transmission on the uplink, $N_{dn}$ STAs are selected for simultaneous transmission on the downlink, $N_{up}$ may or may not be equal to Nan, and $N_{up}$ and $N_{dn}$ may be static values or can change for each scheduling interval. The beam-steering or some other spatial processing technique may be used at the AP 110 and STA 120.

On the uplink, at each STA 120 selected for uplink transmission, a TX data processor 288 receives traffic data from a data source 286 and control data from a controller 280. TX data processor 288 processes (such as encodes, interleaves, and modulates) the traffic data for the STA 120 based on the coding and modulation schemes associated with the rate selected for the STA 120 and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP 110.

$N_{up}$ STAs may be scheduled for simultaneous transmission on the uplink. Each of these STAs performs spatial processing on its data symbol stream and transmits its set of transmit symbol streams on the uplink to the access point.

At AP 110, $N_{ap}$ antennas 224a-224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (such as demodulates, deinterleaves, and decodes) each recovered uplink data symbol stream in accordance with the rate used for that stream to obtain decoded data. The decoded data for each STA may be provided to a data sink 244 for storage or a controller 230 for further processing. The controller 230 may be coupled with a memory 232.

On the downlink, at AP 110, a TX data processor 210 receives traffic data from a data source 208 for $N_{dn}$ STAs scheduled for downlink transmission, control data from a controller 230, and possibly other data from a scheduler 234. The various types of data may be sent on different transport channels. TX data processor 210 processes (such as encodes, interleaves, and modulates) the traffic data for each STA based on the rate selected for that STA. TX data processor 210 provides $N_{dn}$ downlink data symbol streams for the $N_{dn}$ STAs. A TX spatial processor 220 performs spatial processing (such as a precoding or beamforming, as described in the present disclosure) on the Nan downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STAs 120. The decoded data for each STA may be provided to a data sink 272 for storage and/or a controller 280 for further processing.

At each STA 120, $N_{ut,m}$ antennas 252 receive the $N_{ap}$ downlink signals from AP 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA 120. The receiver spatial processing is performed in accordance with the CCMI, MMSE or some other technique. An RX data processor 270 processes (such as demodulates, deinterleaves and decodes) the recovered downlink data symbol stream to obtain decoded data for the STA 120.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the STA 120 based on the downlink channel response matrix $H_{dn,m}$ for that STA 120. Controller 230 derives the spatial filter matrix for the access point based on the effective uplink channel response matrix $H_{up,eff}$. Controller 280 for each STA 120 may send feedback information (such as the downlink or uplink eigenvectors, eigenvalues, SNR estimates, and so on) to the AP 110. Controllers 230 and 280 also control the operation of various processing units at AP 110 and STA 120, respectively.

The controller 230 and/or other processors and modules at the AP 110 may perform or direct the execution of processes for the techniques described herein for UL TX mode selection and triggering. For example, as shown in FIG. 2, the controller 230 of the AP 110 includes CEB waveform manager 231. The controller 280 of the STA 120 includes CEB waveform manager 281. The CEB waveform manager 231 and/or the CEB waveform manager 281 may be configured to generate a Barker-modulated waveform having a constant envelope and to transmit the Barker-modulated waveform in a WLAN system.

As discussed above, certain WLAN systems have Barker transmit waveforms with limited transmit power, due to factors such as spectral shaping and sensitivity to PA nonlinearity. For example, the WLAN standards (e.g., 802.11b) may define various parameters for the waveform, including the spectral mask. The PAPR may be reduced for the filtering for the spectral mask. To increase the data rate, information may be encoded in both amplitude and phase of the RF signal and a linear power amplifier (PA) may be used. However, the transmit power may be further reduced due to sensitivity to PA nonlinearity.

Accordingly, techniques and apparatus for WLAN transmissions that are compliant with a WLAN waveform with reduced PAPR, that may be transmitted with higher power (e.g., thereby improving the link budget) are desirable.

Example CEB-Modulated WLAN Waveform

Aspects of the present disclosure provide for a Barker transmission waveform with a constant envelope. The constant envelope Barker (CEB) waveform may be compliant with a wireless local area network (WLAN) system. For example, the CEB waveform may be 802.11 (e.g., 802.11b) compliant. As discussed above, the CEB waveform may be resilient to power amplifier (PA) nonlinearity and may be transmitted at maximum transmit power with 0 dB peak-to-average-power ratio (PAPR). For example, the PA can be driven at Psat. The CEB waveform may be transmitted at 1 or 2 Mbps Barker rates. Because the waveform has a 0 PAPR, the signal may be referred to as having a constant envelope. In some examples, a Barker waveform without constant envelope may still be supported, such as for systems with different spectrum shaping. As will be discussed in more detail below, the Barker spreading, modulation, and filtering are applied in the phase domain, rather than in the in-phase/quadrature (IQ) domain, allowing 1 and −1 to be represented by multiples of pi ($\pi$).

Figure 3:
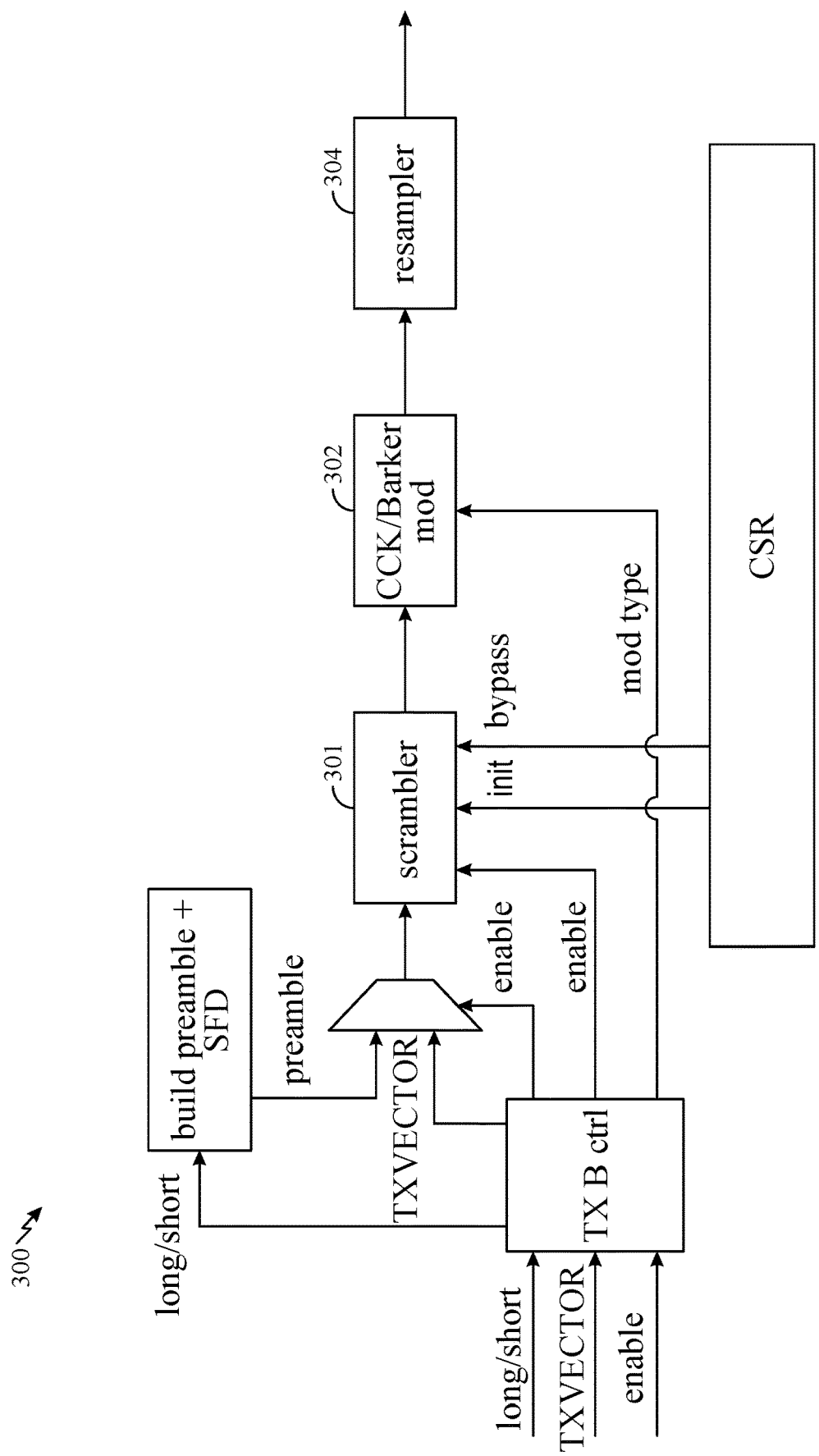
FIG. 3 shows a block diagram of an example transmitter configured to transmit a wireless local area network (WLAN)-compliant Barker waveform with a constant envelope.

FIG. 3 shows a block diagram of an example transmitter 300 configured to transmit a WLAN-compliant Barker waveform with constant envelope. As shown in FIG. 3, the transmitter 300 includes a Barker module 302 and a resampler block 304. According to aspects of the disclosure, the Barker modulator 302 and the resampler block 304 may be modified, with respect to an 802.11 Barker waveform transmitter, for a constant envelope waveform. In addition, upsampling and filtering may be different for the CEB waveform.

Figure 4:
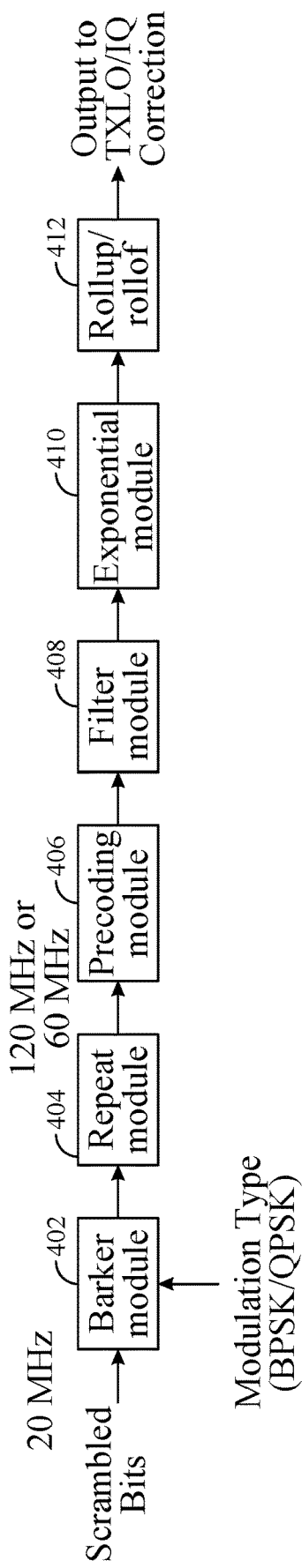
FIG. 4 shows a block diagram of example WLAN-compliant constant envelope Barker waveform modulator and resampler blocks that may be included in a transmitter.

FIG. 4 shows a block diagram of example WLAN-compliant constant envelope Barker waveform modulator and resampler blocks that may be included in a transmitter. For example, the components illustrated in FIG. 4 may be an example of the Barker module 302 and resampler block 304 illustrated in FIG. 3. As shown in FIG. 4, the components may include a Barker module 402, a repeat module 404, a precoding module 406, a filter module 408, an exponential module 410, and a roll up/roll off module 412.

The Barker module 402 may receive scrambled bits as input. For example, the scrambled bits may be output from the scrambler block 301 in FIG. 3. The Barker module 402 may be based on a quadrature phase-shift keying (QPSK) modulation, binary phase-shift keying (BPSK), or other modulation. The Barker module 402 may be configured to modulate the scrambled bits and output resampled Barker phase code. The resampling may be based on the repeat module 404 (e.g., a 3 or 6× repeat module). The Barker phase codes may be resampled at 60 MHz, 120 MHz, or other frequency. In some examples, resampled codes may be pre-stored in look-up tables (e.g., in four LUTs). The Barker module 402 may use four different phase codes, which may minimize signal-to-noise ratio (SNR) loss caused by correlated error vector magnitude (EVM) degradation across symbols. The Barker module 402 may be configured to cycle across the four codes. The Barker phase codes may represented by pi. In some examples, at 11 MHz, the codes may be represented as:

[0 1 2 2 1 0 0 0 −1 −1 −1] *pi;
[0 −1 −2 −2 −1 0 0 0 1 1 1]*pi;
[0 1 2 2 1 0 0 0 1 1 1] *pi; and
[0 −1 −2 −2 −1 0 0 0 −1 −1 −1]*pi;

For BPSK, the Barker module 402 adds pi if the bit=1. For QPSK, the Barker module 402 adds {0, pi/2, pi, −pi/2} for input bits {00, 01, 11, 10}.

The precoding module 406 can apply precoding to the Barker symbols (e.g., the resampled Barker phase codes output from the Barker module 402). For each Barker symbol, the precoding module 406 may calculate the delta phase as the difference of the last phase of the previous Barker symbol and the first phase of the current Barker symbol. The precoding module 406 rounds the difference to the nearest multiple of 2pi and adds the rounded delta phase to all phases of the current symbol.

The filter module 408 may implement an input response (IR) filter. In some examples, the filter module 408 is a Gaussian filter. In some examples, the filter module 408 is a Butterworth filter or other type of filter. In some examples, the filter module 408 can filter with 33 taps at 120 MHz and can be hardcoded.

The exponential module 410 may be an $e^{j}$ phasor module, where j is $\sqrt{-1}$. The exponential module 410 may map the signal to the IQ domain.

The rollup/rolloff module 412 may apply a 200 ns rollup or rolloff. The rollup/rolloff module 412 may apply the rollup or rolloff only at a start and/or an end of the packet. This may avoid discontinuities that can cause wideband interference.

The bits can then be output to the transmit local oscillator (TXLO) and IQ domain, at which radio frequency (RF) impairment correction may be applied to the bits.

Figure 5:
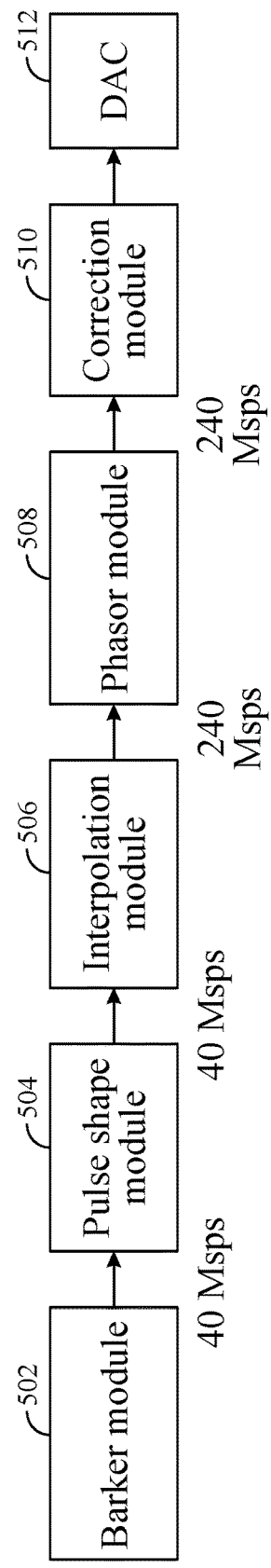
FIG. 5 shows a block diagram of another example WLAN-compliant constant envelope Barker waveform modulator and resampler blocks that may be included in a transmitter.

FIG. 5 shows a block diagram of other example WLAN-compliant constant envelope Barker waveform modulator and resampler blocks that may be included in a transmitter. For example, the components illustrated in FIG. 5 may be an example of the Barker module 302 and resampler block 304 illustrated in FIG. 3. As shown in FIG. 5, the components may include a Barker module 502, a pulse shape module 504, an interpolation modulate 506, a phasor module 508, a filter module 408, a correction module 510, and a digital-to-analog converter (DAC) 512.

Figure 6:
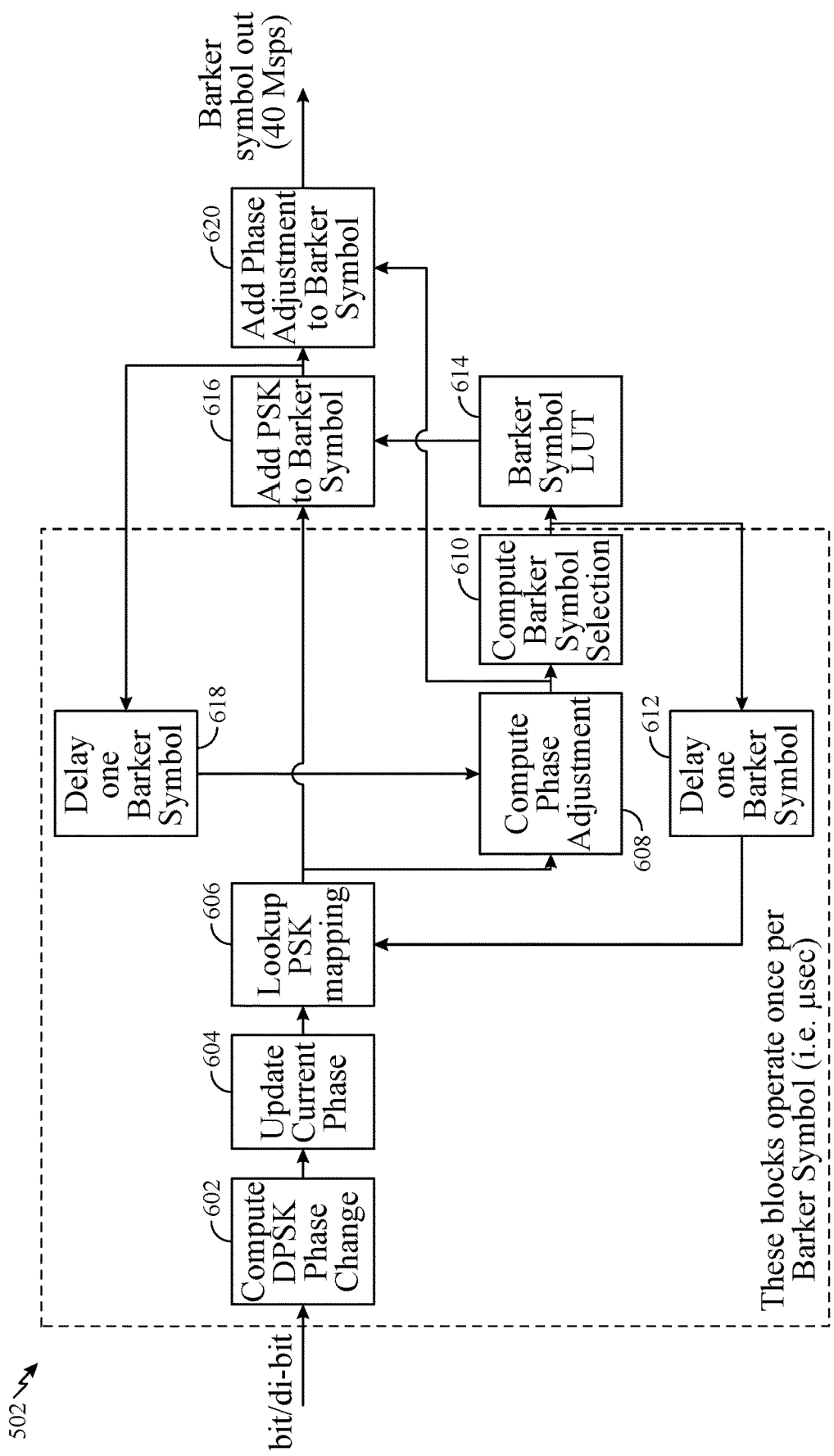
FIG. 6 shows a block diagram of an example Barker encoder block of a WLAN-compliant constant envelope Barker waveform modulator.

The Barker module 502 may be an encoder. The Barker module 502 may operate only in the phase domain. FIG. 6 shows a block diagram of an example Barker module 502. As shown in FIG. 6, the Barker module 502 may compute a differential phase-shift keying (DPSK) phase change at block 602 and update the current phase at block 604. The phase may accumulate in the phase domain. Aspects of the phase-shift keying (PSK) mapping in the example Barker module shown in FIG. 6 may prevent the phase from accumulating too large.

At block 606, the Barker module 502 can look up a PSK mapping. In the phase domain, pi and negative pi do not correspond to the same value. The Barker module 502 can switch DPSK encoding from Barker symbol to Barker symbol to improve the output spectrum. The Barker module 502 may select between two mappings of the current phase (e.g., as updated at block 604) to the DPSK phase to apply to the Barker symbol (e.g., at block 616). FIG. 7 shows a table with example phase mappings used by the Barker module 502.

At block 608, the Barker module 502 may compute a phase adjustment. The Barker symbols can be constructed such that the phase can drift by 3pi over a Barker symbol. Large jumps in phase may negatively impact the output spectrum. Thus, the Barker module 502 may adjust the phase of the current symbol so that the phase jump between the last sample of the previous symbol and first sample of the current symbol is less than 2pi. The Barker module 502 may compute a value delta_phi that is added to output Barker symbol samples to reduce the phase jump between symbols. In some examples, the delta_phi value is computed as delta_phi=delta_phi+round ((phase_of_previous_sample−dpsk)/(2.0*PI)). The phase of the last sample of the previous Barker symbol is stored for this computation. In some examples, before DPSK modulation, the first sample of each Barker symbol is 0. Thus, the output of the look up at block 606 (e.g., the PSK mapping) represents the phase of the first sample of the current Barker symbol before adjustment by delta_phi.

At block 610, the Barker module 502 computes the Barker symbol selection. The delta_phi information may be used to select the Barker symbols to reverse the direction of phase accumulation. For example, if delta_phi has a large positive value, then a Barker symbol ending in negative pi may be selected. And if delta_phi has a large negative value, then a Barker symbol ending in positive pi may be selected. In some examples, the Barker symbol phase selection may be computed as:

```
const int offsetThreshold=1;
if (delta_phi<-offsetThreshold) {
int phase_choice[4]={1, 2, 1, 2};
barker_symbol_phase_=phase_choice[barker_symbol-
    _phase_];
} else if (delta_phi >offsetThreshold) {
int phase_choice[4]={0, 3, 0, 3};
barker_symbol_phase_=phase_choice[barker_symbol-
    _phase_];
} else {
barker_symbol_phase_=(barker_symbol_phase+1)   &
    0x3;
}
```

At block 612, the Barker module 502 may delay by one Barker symbol and return to block 606. As shown in FIG. 6, the Barker module 502 may perform the blocks 602-612 for each Barker symbol.

At block 614, the Barker module 502 uses the Barker symbol phase from block 612 to select the Barker symbol from the LUT. The four different Barker codes that are different in the phase domain may be equivalent at the output of a phasor. In some examples, the Barker symbols are 40 samples long. In an illustrative example, Symbol0={0, 0, 0, 0, 2, 2, 2, 2, 4, 4, 4, 4, 4, 4, 4, 2, 2, 2, 2, 0, 0, 0, 0, 0, 0, 0, 0, 0, 0, 0, −2, −2, −2, −2, −2, −2, −2, −2, −2, −2}; Symbol1=−Symbol0; Symbol2={0, 0, 0, 0, 2, 2, 2, 2, 4, 4, 4, 4, 4, 4, 2, 2, 2, 2, 0, 0, 0, 0, 0, 0, 0, 0, 0, 0, 2, 2, 2, 2, 2, 2, 2, 2, 2, 2}; and Symbol3=−Symbol2.

At block 616, the Barker module 502 adds the PSK to the current Barker symbol. Each sample of the current Barker symbol selected at block 614 may be multiplied by the PSK value computed at block 606. The last sample of the computation may be stored for use in block 608 of the next Barker symbol. For example, at block 618, the Barker module 502 may delay one Barker symbol and return to block 608.

At block 620, the Barker module 502 adds the phase adjustment to the Barker symbol. For example, the output of block 608 is added to each output of block 618.

CEB filtering may include filters. In some examples, the CEB filtering uses one or more finite impulse response (FIR) filters, IIR filters, or other types of filters. In the illustrated examples, the CEB filtering uses two recursive IIR filters. In some examples, the pulse shape module 504 is a third-order Butterworth IR filter and the interpolation module 506 (e.g., interp by 3 or 6) is another fourth-order IR filter, such as an Nth-band polyphase IIR. Both filters may be implemented using all-pass sub-filters (e.g., first-order or second-order). Each all-pass sub-filter may be implemented using the same wave-digital filter (WDF) two-port building block.

Figure 8:
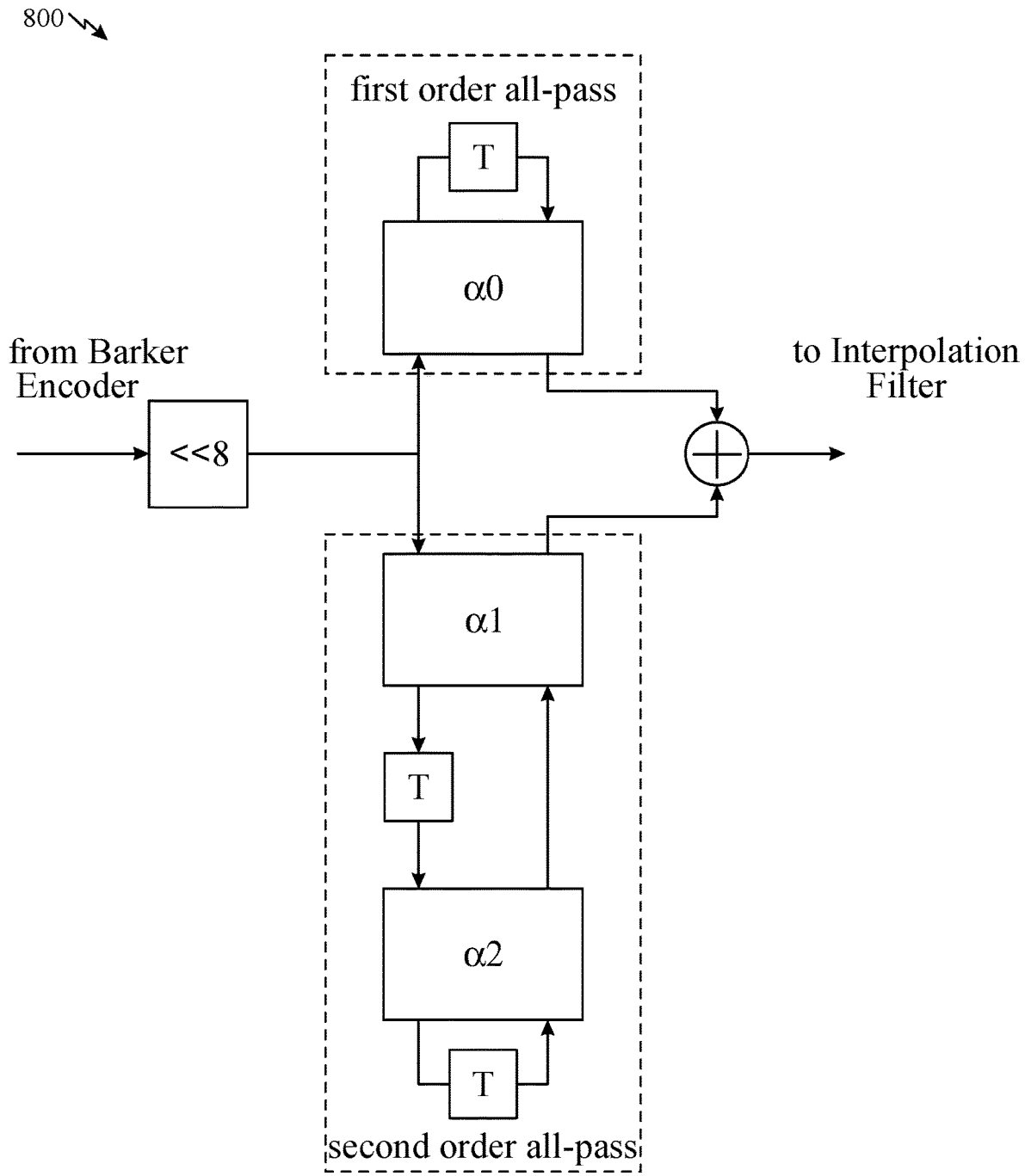
FIG. 8 shows a block diagram of an example third-order filter block of a WLAN-compliant constant envelope Barker waveform modulator.
Figure 9:
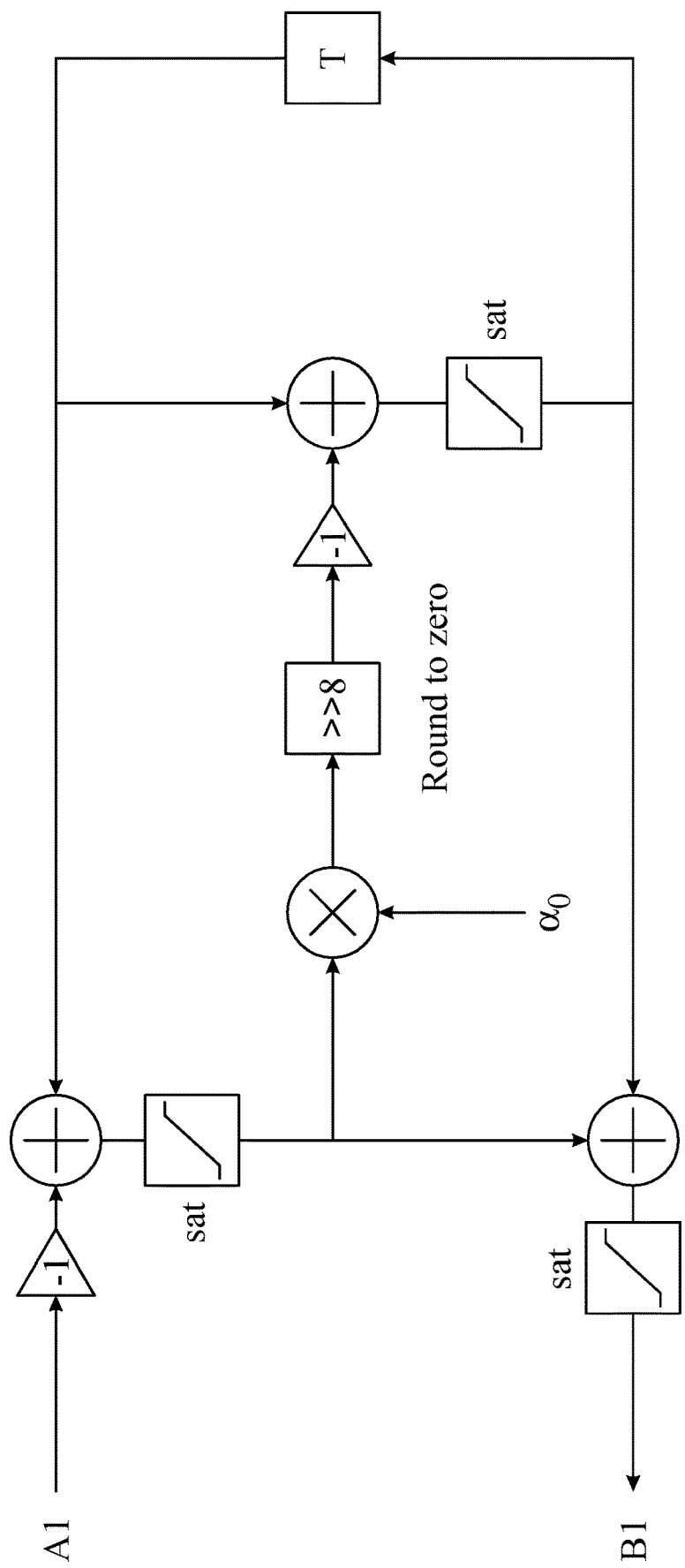
FIG. 9 shows a block diagram of example first-order filter portion of the third-order filter block of FIG. 8.
Figure 10:
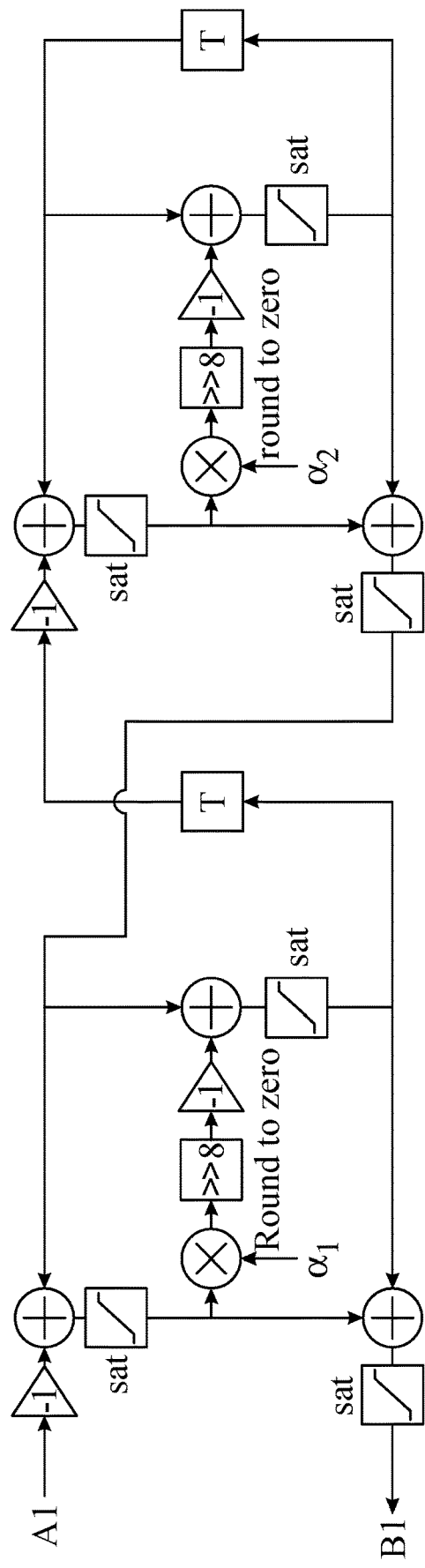
FIG. 10 shows a block diagram of example second-order filter portion of the third-order filter block of FIG. 8.

The third-order Butterworth filter may shape the spectrum at a 40 MHz sampling rate. The third-order Butterworth filter may have programmable coefficients. The third-order Butterworth filter may be a lattice wave digital filter (LWDF). FIG. 8 shows a block diagram of an example third-order filter 800 of a WLAN-compliant constant envelope Barker waveform modulator. FIG. 9 shows a block diagram of example first-order filter portion of the third-order filter block. And FIG. 10 shows a block diagram of example second-order filter portion of the third-order filter block. As shown in FIGS. 8-10, the third-order filter can be implemented as the sum of the outputs from a first-order all-pass and a second-order all-pass filter. The filter may run at a 40 MHz sampling rate. The coefficients may be configurable via a LUT that stores coefficients (alphas) for the Butterworth response with filter corner from 3.5 MHz to 4.5 MHz in 100 kHz steps. In some examples, alpha parameters determine the shape of a filter, for example, by specifying the roll-off or excess bandwidth factor (e.g., the amount of bandwidth used in excess of the theoretical threshold, such as a Nyquist threshold). FIG. 11 shows a table 1100 with example alpha parameter values used for the third-order filter block. As shown in FIG. 11, a register may configure one of eleven possible filter corner settings (e.g., 3.5 to 4.5 MHz in 100 kHz steps). The register may act as an index into the table 1100 of alpha values.

Figure 12:
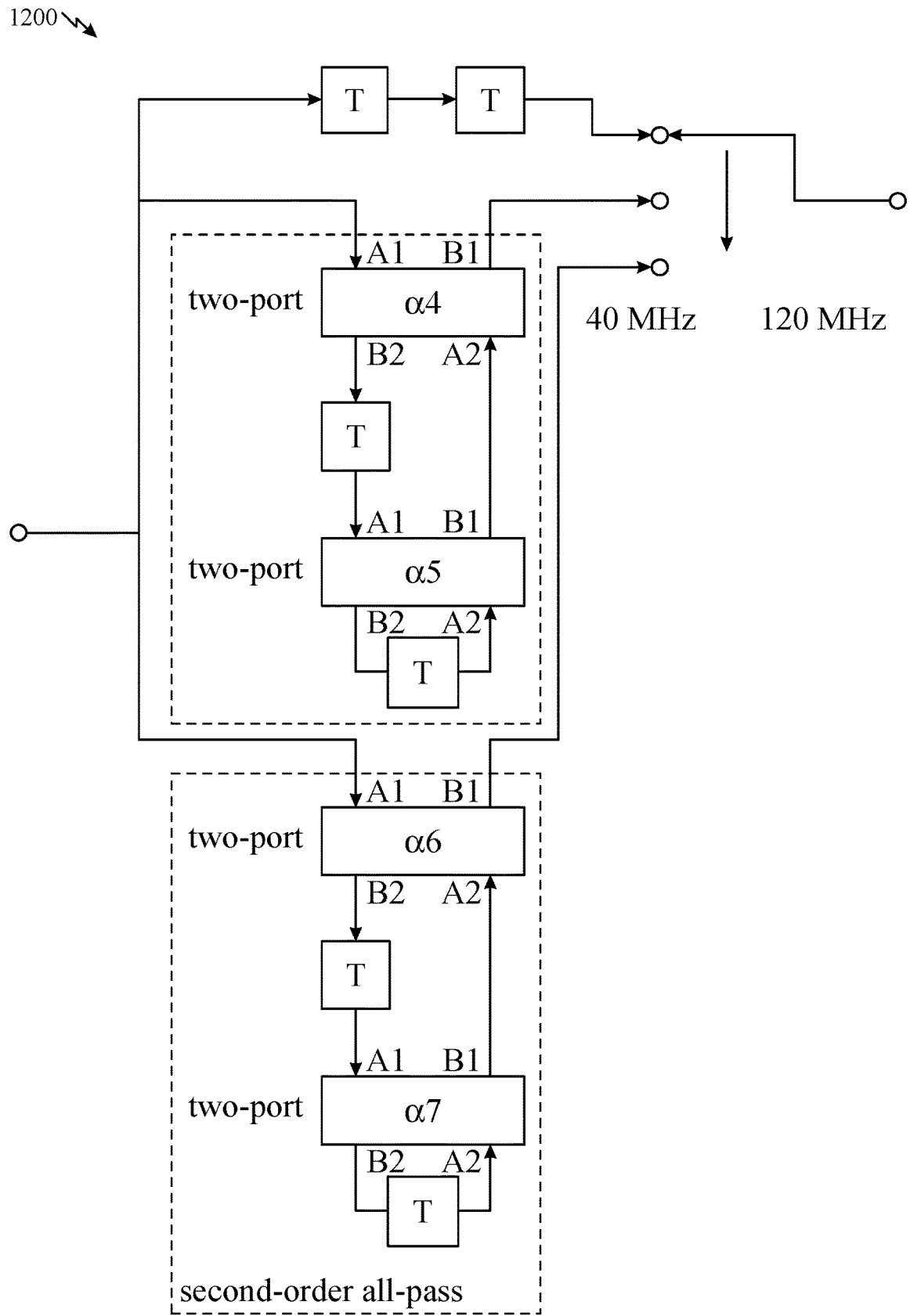
FIG. 12 shows a block diagram of an example fourth-order filter block of a WLAN-compliant constant envelope Barker waveform modulator.
Figure 13:
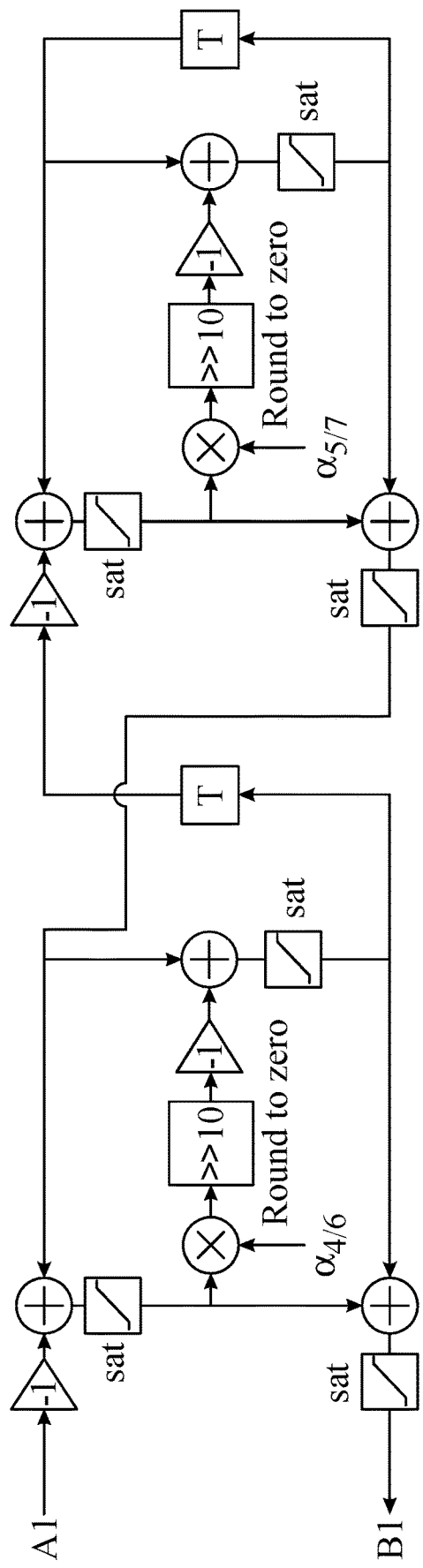
FIG. 13 shows a block diagram of example components of the fourth-order filter block of FIG. 12.
Figures 14, 15:
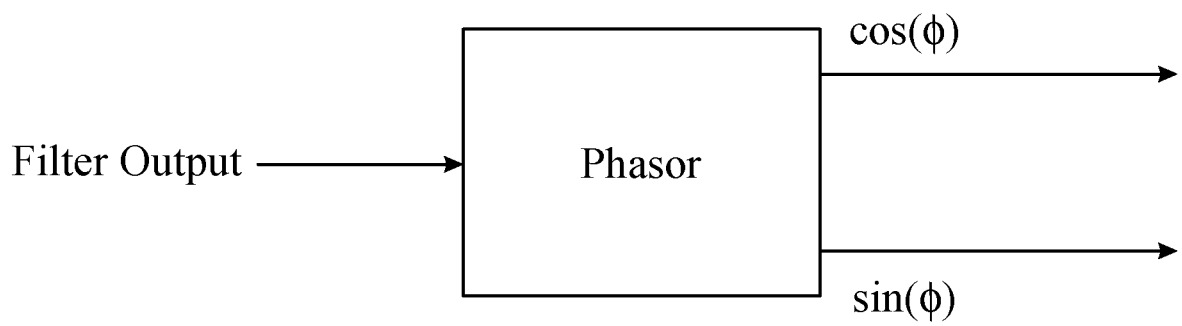
FIG. 14 shows a table with example alpha parameter values used for the fourth-order filter block of FIG. 12.
FIG. 15 shows a block diagram of an example phasor-generation block of a WLAN-compliant constant envelope Barker waveform modulator.

The fourth-order polyphase filter can interpolate the signal (e.g., to 120 MHz). The fourth-order polyphase filter may use four fixed coefficients. The fourth-order polyphase filter may be implemented as two second-order WDFs. The two second-order WDFs may operate at a 40 MHz sampling rate. FIG. 12 shows a block diagram of an example fourth-order filter 1200 of a WLAN-compliant constant envelope Barker waveform modulator. FIG. 13 shows a block diagram of example components of the fourth-order filter block. As shown in FIGS. 12 and 13, the interpolation module 506 may be implemented by the fourth-order filter by taking the outputs of three parallel paths running at 40 MHz. The first path can be two delay elements in series. The second and third paths are two second-order all-pass filters with fixed coefficients. FIG. 14 shows a table 1400 with example alpha parameter values used for the fourth-order filter block.

FIG. 15 shows a block diagram of an example phasor-generation block of a WLAN-compliant constant envelope Barker waveform modulator. For example, the components in FIG. 15 may be the phasor module 508. The output of the interpolation module 506 may be a 16-bit signed value in which $-2^{15}$ corresponds to $-8\pi$ and $2^{15}-1$ corresponds to $8\pi-\varepsilon$. The output of the interpolation module 506, $\phi$, is the argument of a phasor such that the real output is $1023*\cos(\phi)$ and the imaginary output is $1023*\sin(\phi)$.

Figure 16:
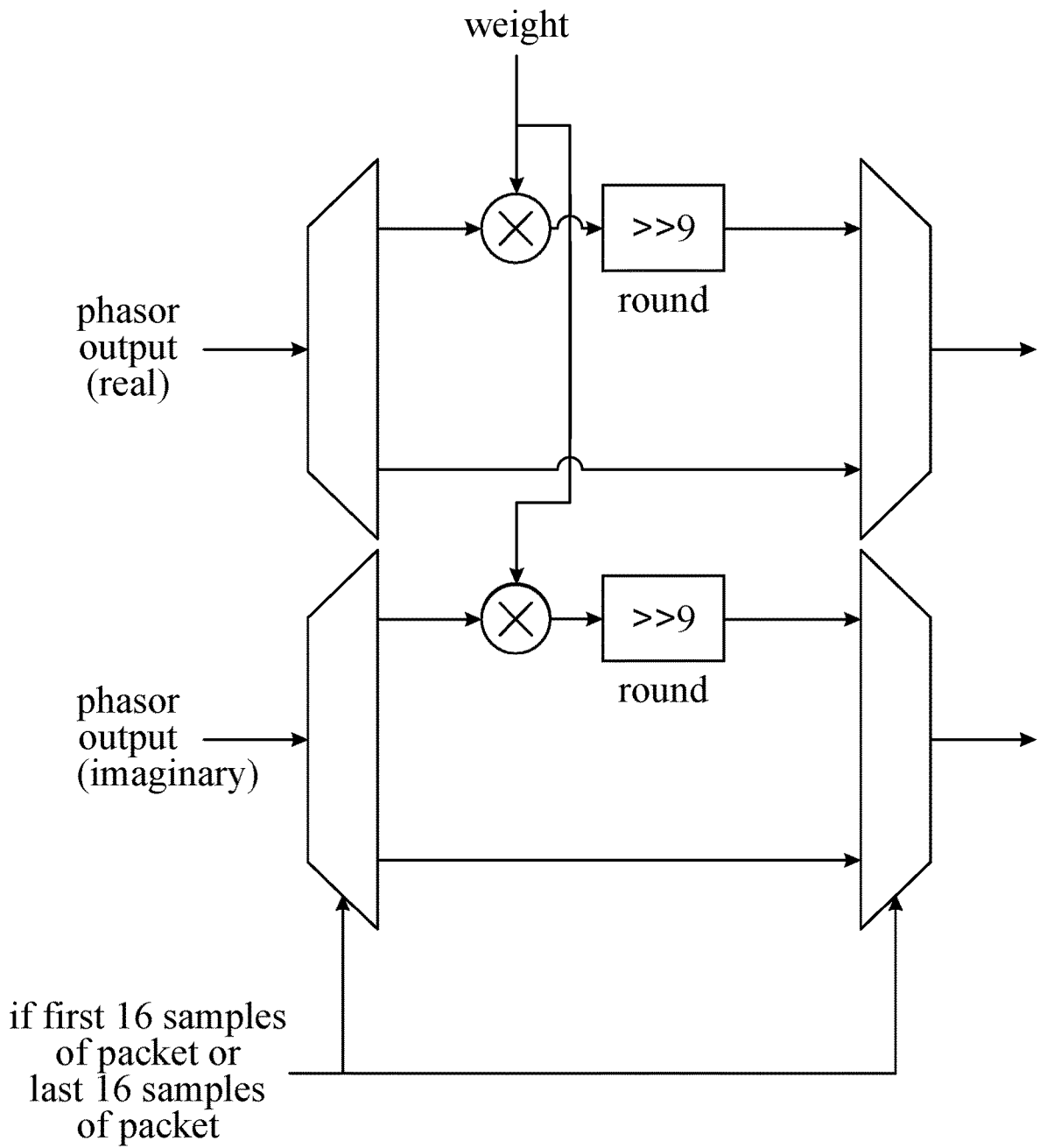
FIG. 16 shows a block diagram of example component blocks of a ramp-up/ramp-down block of a WLAN-compliant constant envelope Barker waveform modulator.

FIG. 16 shows a block diagram of example component blocks of a ramp-up/ramp-down block (or roll-up/roll-down) of a WLAN-compliant constant envelope Barker waveform modulator. In some examples, at the beginning of each packet, the first (e.g., the first 16) real and imaginary outputs from the phasor-generation block may be weighted by a sequence of values (e.g., {0, 5, 19, 43, 75, 114, 158, 206, 256, 306, 354, 398, 437, 469, 493, 507}). At the end of each packet, the last (e.g., the last 16) real/imaginary outputs from the phasor generation block may be weighted by the sequence of values in reverse order (e.g., {507, 493, 469, 437, 398, 354, 306, 256, 206, 158, 114, 75, 43, 19, 5, 0}).

Figure 17:
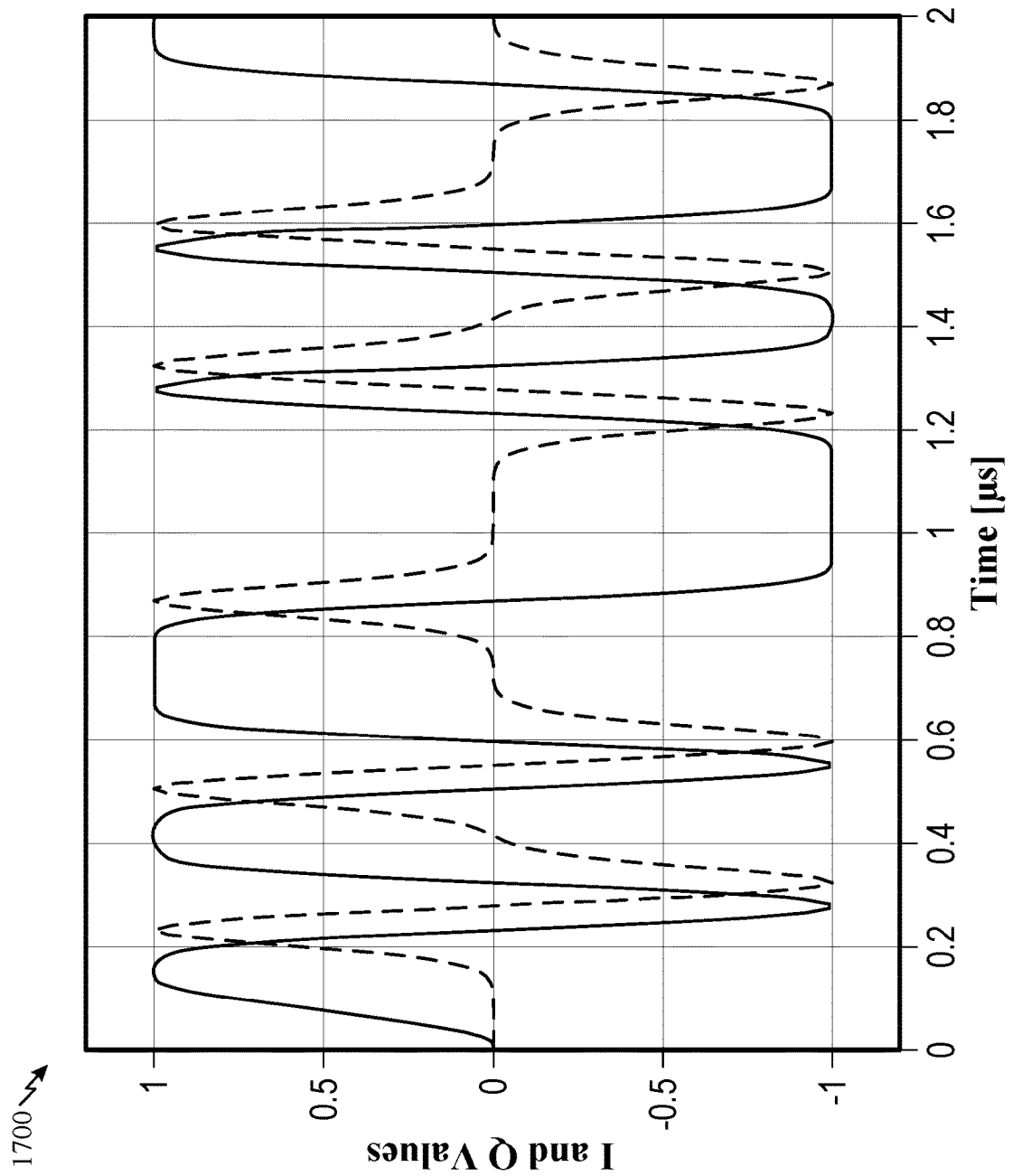
FIG. 17 shows a graph of an example WLAN-compliant constant envelope Barker envelope waveform.
Figure 18:
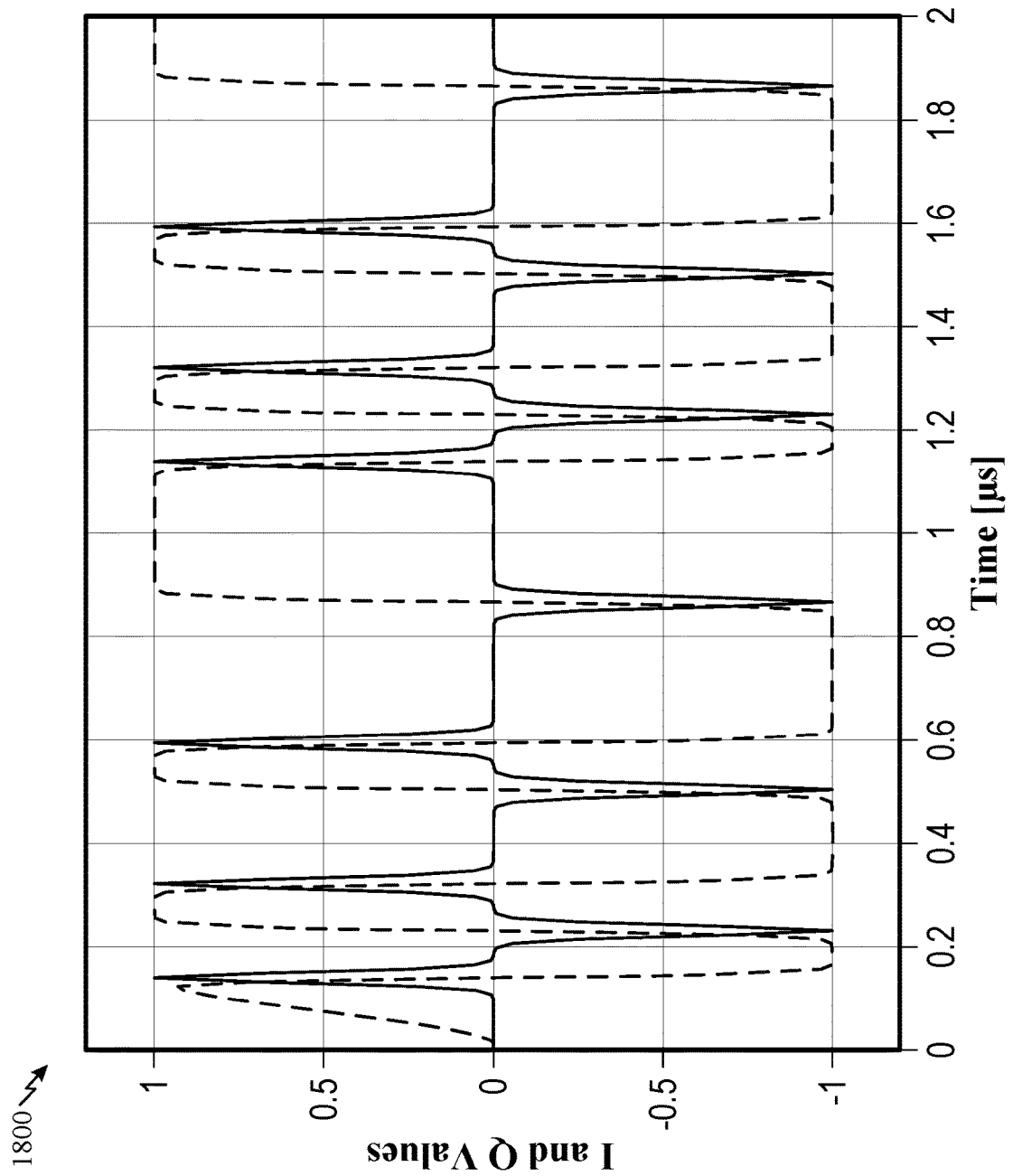
FIG. 18 shows a graph of another example WLAN-compliant constant envelope Barker envelope waveform.

FIG. 17 shows a graph 1700 of an example WLAN-compliant constant envelope Barker envelope waveform. The I and Q values are plotted over time. FIG. 18 shows a graph 1800 of another example WLAN-compliant constant envelope Barker envelope waveform at different EVM.

Figure 19:
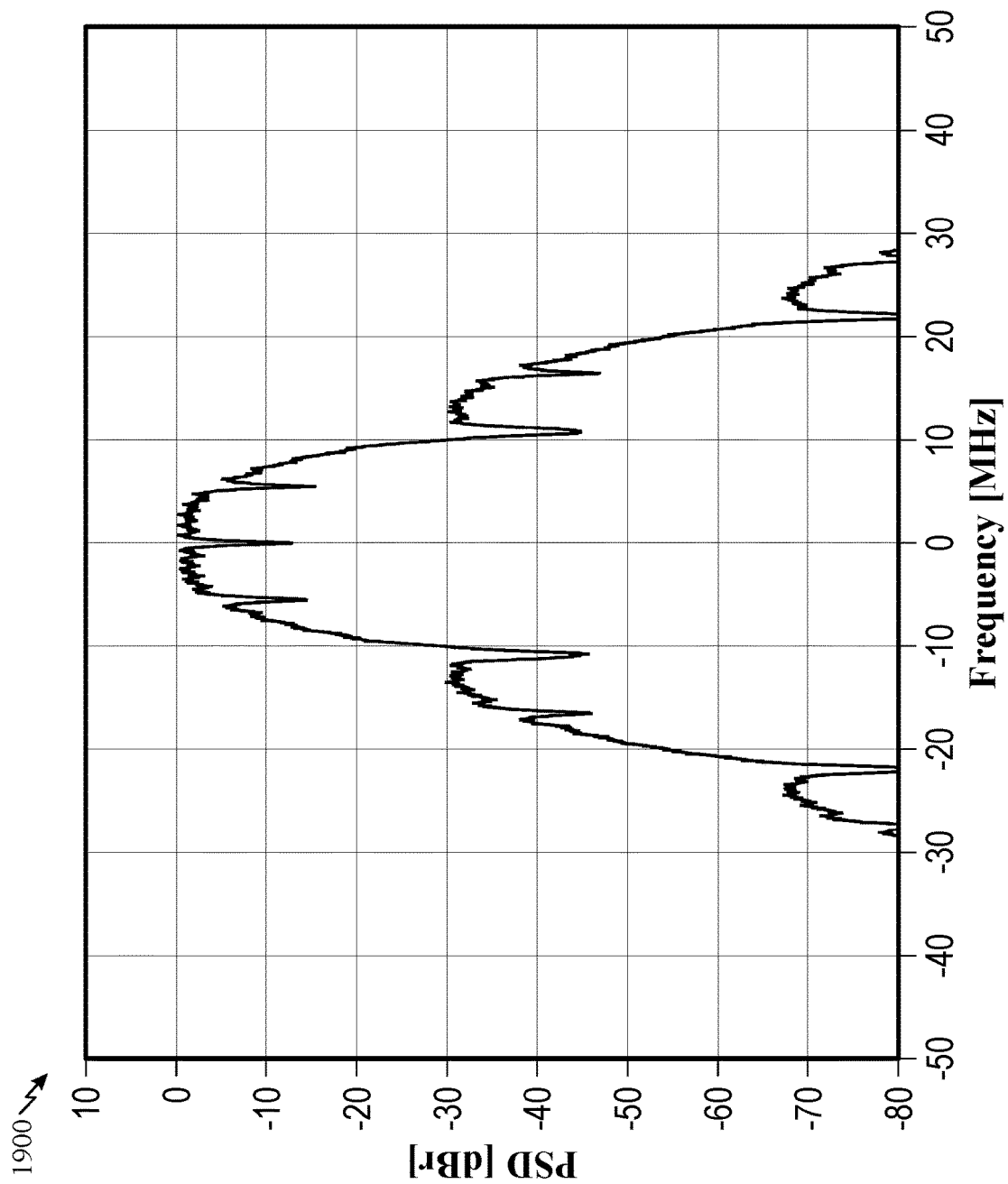
FIG. 19 shows a graph of an example WLAN-compliant constant envelope Barker envelope waveform spectral mask.

FIG. 19 shows a graph 1900 of an example WLAN-compliant constant envelope Barker envelope waveform spectral mask. The power spectral density (PSD) is plotted over different frequencies for an example 1 Mbps with a Gaussian filter and bandwidth time product (BT)=0.33. The BT may define the shapes of a Gaussian filter (e.g., specifies the amount of filter roll-off). As shown, the spectrum is compliant with both a Federal Communications Commission (FCC) and IEEE 802.11b spectral mask.

Figure 20:
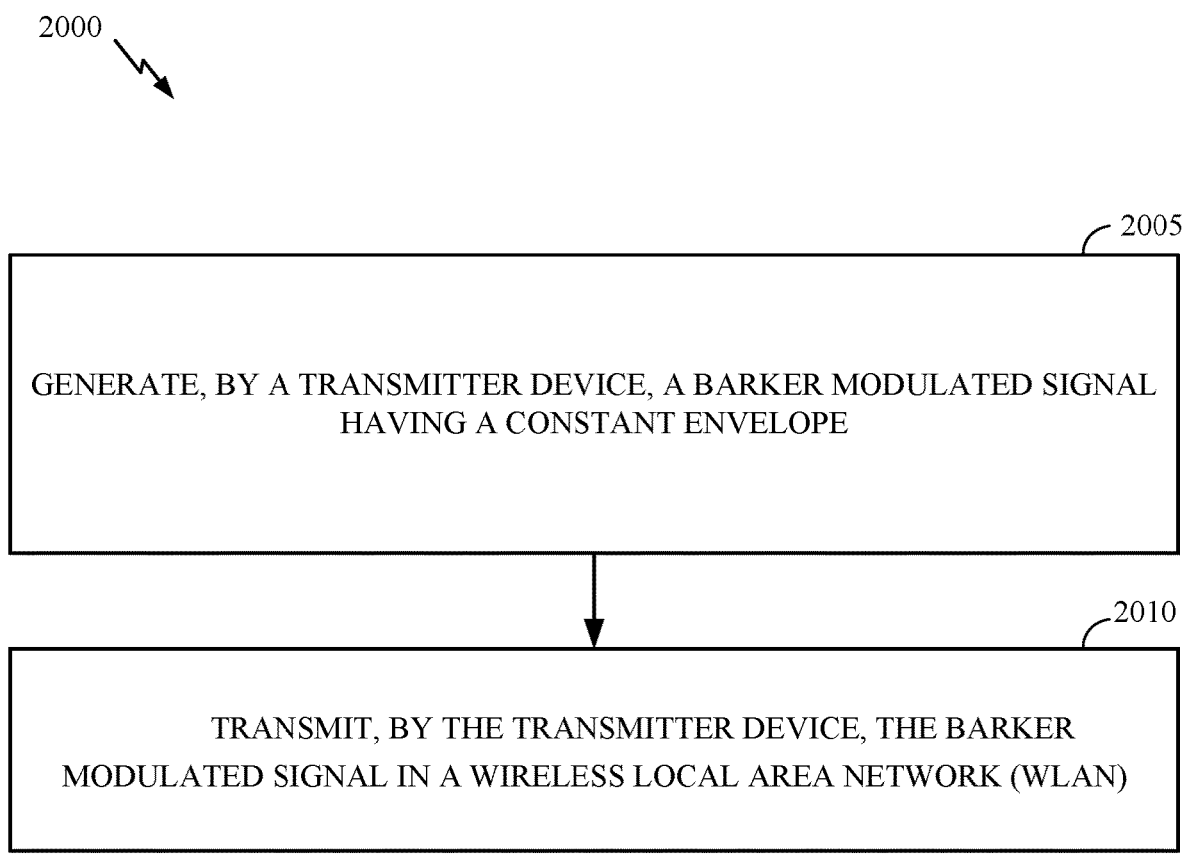
FIG. 20 shows a flow diagram of example operations for a WLAN-compliant constant enveloper Barker waveform signal.

FIG. 20 is a flow diagram illustrating example operations 2000 for wireless communication, in accordance with certain aspects of the present disclosure. The operations 2000 may be performed, for example, by a transmitter device (e.g., such as the STA 120ƒ or AP 110$_1$ in the network 100). Operations 2000 may be implemented as software components that are executed and run on one or more processors (e.g., controller 230 and/or controller 280 of FIG. 2). Further, the transmission and reception of signals in operations 2000 may be enabled, for example, by one or more antennas (e.g., antennas 224 and/or 252 of FIG. 2). In certain aspects, the transmission and/or reception of signals may be implemented via a bus interface of one or more processors (e.g., controller 230 and/or controller 280) obtaining and/or outputting signals.

The operations 2000 may begin, at 2005, by generating a Barker-modulated signal having a constant envelope. The transmitter device may generate the Barker-modulated signal at a processing system of the transmitter device. The processing system may include one or more of the components as described above with respect to FIGS. 3-19. Generating the Barker-modulated signal may include scrambling bits to obtain scrambled bits; and encoding the scrambled bits to obtain a plurality of different Barker phase codes in a phase domain. The plurality of different Barker phase codes may be represented by values of pi. Generating the Barker-modulated signal may further include precoding each symbol of the plurality of different Barker phase codes by calculating a phase difference between a first phase of a current symbol and a last phase of a previous symbol, rounding the phase difference to a nearest two pi, and adding the rounded phase difference to each phase of the current symbol. Generating the Barker-modulated signal may further include filtering the plurality of different Barker phase codes in the phase domain. The filtering may use a Gaussian FIR filter or a Butterworth IIR filter. Generating the Barker modulated signal may further include mapping the filtered Barker phase codes to the IQ domain.

At 2010, the transmitter device transmits the Barker-modulated signal in a WLAN. The transmitter device may transmit via an interface. The transmitter device may transmit the Barker-modulated signal at peak PA power. The Barker-modulated signal may conform to an IEEE 802.11b waveform. The transmitter device may transmit the Barker-modulated signal at a 1 or 2 Mbps rate with a Barker spread spectrum sequence.

Figure 21:
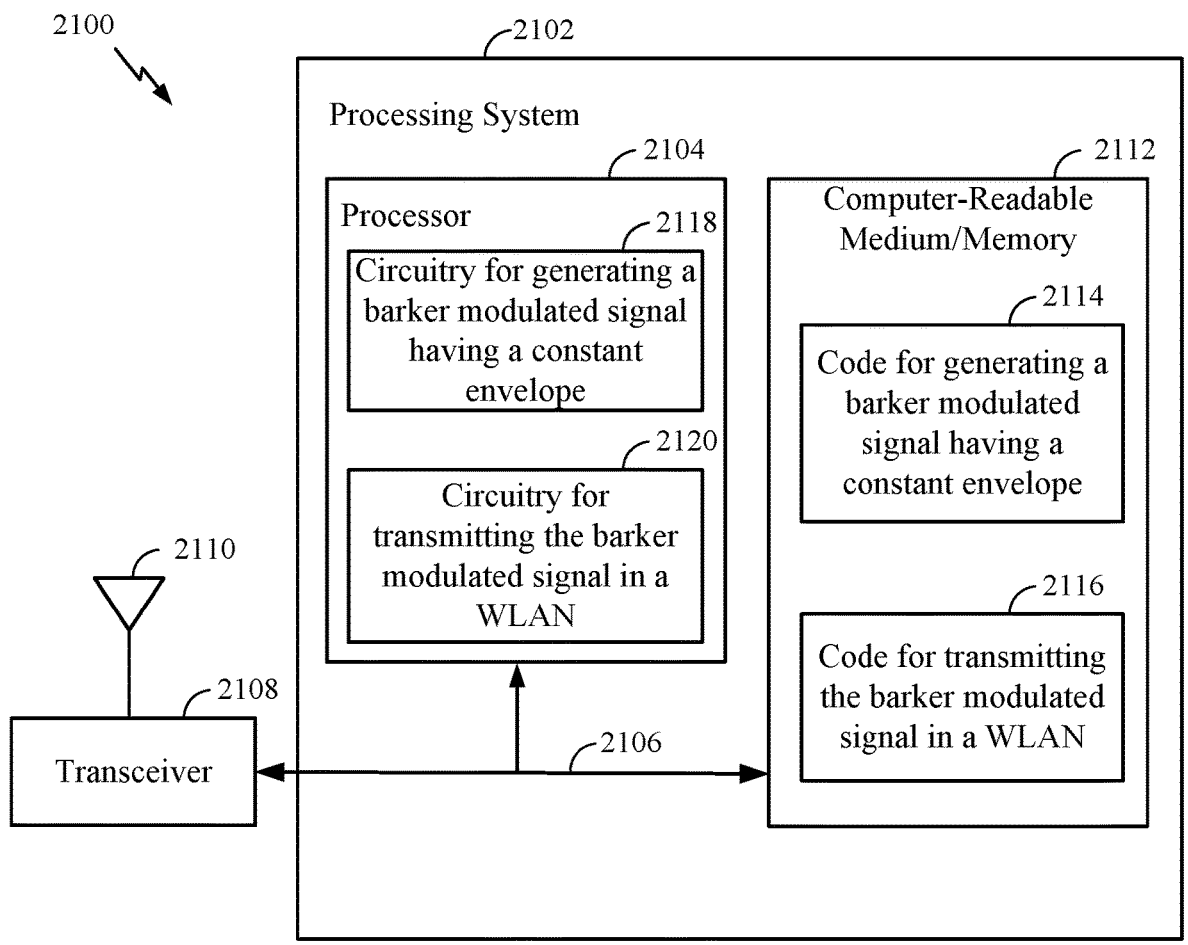
FIG. 21 illustrates a communications device that may include various components configured to perform operations for the techniques disclosed herein.

FIG. 21 illustrates a communications device 2100 that may include various components (e.g., corresponding to means-plus-function components) configured to perform operations for the techniques disclosed herein, such as the operations illustrated in FIG. 20. The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., computer-executable code) that when executed by the processor 2104, cause the processor 2104 to perform the operations illustrated in FIG. 20, or other operations for performing the various techniques discussed herein for a CEB waveform for a WLAN signal. In certain aspects, computer-readable medium/memory 2112 stores code 2114 for generating a Barker-modulated signal having a constant envelope and code 2116 for transmitting the Barker-modulated signal in a WLAN, in accordance with aspects of the present disclosure. In certain aspects, the processor 2104 has circuitry configured to implement the code stored in the computer-readable medium/memory 2112. The processor 2104 includes circuitry 2118 for generating a Barker-modulated signal having a constant envelope and circuitry 2120 for transmitting the Barker-modulated signal in a WLAN, in accordance with aspects of the present disclosure.

The various operations of methods described above may be performed by any suitable means capable of performing the corresponding functions. The means may include various hardware or software component(s) or module(s), including, but not limited to a circuit, an application specific integrated circuit (ASIC), or processor.

Means for transmitting may include a transmitter (such as the transmitter unit 222) or an antenna(s) 224 of the AP 110 illustrated in FIG. 2 and/or a transmitter (such as the transmitter unit 254) or an antenna(s) 252 of the UT 120 illustrated in FIG. 2. Means for generating, means for scrambling, means for calculating, means for rounding, means for adding, means for filtering, and/or means for mapping may include a processing system, which may include one or more processors, such as the TX data processor 210, the TX spatial processor 220, and/or the controller 230 of the AP 110 illustrated in FIG. 2 and/or processing system, which may include one or more processors, such as the TX data processor 282, the TX spatial processor 290, and/or the controller 280 of the UT 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communications, comprising:
   a processing system configured to generate a Barker-modulated signal having a constant envelope, including:
      scrambling bits to obtain scrambled bits;
      encoding the scrambled bits to obtain a plurality of different Barker phase codes in a phase domain, the plurality of different Barker phase codes being represented by values of pi ($\pi$);
      precoding each symbol of the plurality of different Barker phase codes by:
         calculating a phase difference between a first phase of a current symbol and a last phase of a previous symbol;
         rounding the phase difference to a nearest two pi ($2\pi$); and
         adding the rounded phase difference to each phase of the current symbol; and
   an interface configured to transmit the Barker-modulated signal in a wireless local area network (WLAN).

2. The apparatus of claim 1, wherein the interface is configured to transmit the Barker-modulated signal at a peak power amplifier (PA) power.

3. The apparatus of claim 1, wherein the Barker-modulated signal conforms to an IEEE 802.11b waveform.

4. The apparatus of claim 1, wherein the interface is configured to transmit the Barker-modulated signal at a 1 or 2 Mbps rate with a Barker spread spectrum sequence.

5. The apparatus of claim 1, wherein the processing system is further configured to filter the plurality of different Barker phase codes in the phase domain.

6. The apparatus of claim 5, wherein the processing system is configured to filter the plurality of different Barker phase codes by using a Gaussian or Butterworth impulse response filter.

7. The apparatus of claim 5, wherein the processing system is further configured to map the filtered Barker phase codes to an in-phase and quadrature (IQ) domain.

8. A method for wireless communication by a transmitter device, comprising:
   generating a Barker-modulated signal having a constant envelope, including:
      scrambling bits to obtain scrambled bits;
      encoding the scrambled bits to obtain a plurality of different Barker phase codes in a phase domain, the plurality of different Barker phase codes being represented by values of pi ($\pi$);
      precoding each symbol of the plurality of different Barker phase codes by:
         calculating a phase difference between a first phase of a current symbol and a last phase of a previous symbol;
         rounding the phase difference to a nearest two pi ($2\pi$); and
         adding the rounded phase difference to each phase of the current symbol; and
   transmitting the Barker-modulated signal in a wireless local area network (WLAN).

9. The method of claim 8, wherein the Barker-modulated signal is transmitted at a peak power amplifier (PA) power.

10. The method of claim 8, wherein the Barker-modulated signal conforms to an IEEE 802.11b waveform.

11. The method of claim 8, wherein the Barker-modulated signal is transmitted at a 1 or 2 Mbps rate with a Barker spread spectrum sequence.

12. The method of claim 8, further comprising filtering the plurality of different Barker phase codes in the phase domain.

13. The method of claim 12, wherein the filtering comprising using a Gaussian or Butterworth impulse response filter.

14. The method of claim 12, further comprising mapping the filtered Barker phase codes to an in-phase and quadrature (IQ) domain.

15. An apparatus for wireless communications, comprising:
   means for generating a Barker-modulated signal having a constant envelope, including:
      scrambling bits to obtain scrambled bits;
      encoding the scrambled bits to obtain a plurality of different Barker phase codes in a phase domain, the plurality of different Barker phase codes being represented by values of pi ($\pi$);
      precoding each symbol of the plurality of different Barker phase codes by:
         calculating a phase difference between a first phase of a current symbol and a last phase of a previous symbol;
         rounding the phase difference to a nearest two pi ($2\pi$); and
         adding the rounded phase difference to each phase of the current symbol; and
   means for transmitting the Barker-modulated signal in a wireless local area network (WLAN).

16. The apparatus of claim 15, wherein the Barker-modulated signal is transmitted at a peak power amplifier (PA) power.

* * * * *